(12) United States Patent
Bhatia et al.

(10) Patent No.: US 9,086,291 B1
(45) Date of Patent: Jul. 21, 2015

(54) SYSTEM, METHOD AND DEVICE FOR PROVIDING NAVIGATION INFORMATION BASED ON COVERAGE AREA ASSESSMENT

(75) Inventors: Lalit Tulsidas Bhatia, Alpharetta, GA (US); Radhakrishnan Gopinath, Alpharetta, GA (US); Mark H. Spaulding, Kennesaw, GA (US); Catalina Gard, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 238 days.

(21) Appl. No.: 13/465,742

(22) Filed: May 7, 2012

Related U.S. Application Data

(63) Continuation-in-part of application No. 13/340,299, filed on Dec. 29, 2011, now abandoned.

(51) Int. Cl.
*G01C 21/34* (2006.01)

(52) U.S. Cl.
CPC ........ *G01C 21/3461* (2013.01); *G01C 21/3453* (2013.01)

(58) Field of Classification Search
USPC ........................................................ 701/533
See application file for complete search history.

(56) References Cited

U.S. PATENT DOCUMENTS

| | | | | |
|---|---|---|---|---|
| 6,038,444 | A * | 3/2000 | Schipper et al. | 455/421 |
| 6,400,690 | B1 * | 6/2002 | Liu et al. | 370/252 |
| 6,871,139 | B2 * | 3/2005 | Liu et al. | 701/410 |
| 7,079,945 | B1 * | 7/2006 | Kaplan | 701/451 |
| 7,162,365 | B2 * | 1/2007 | Clapper | 701/431 |
| 7,305,302 | B2 * | 12/2007 | Kaplan | 701/532 |
| 7,627,426 | B2 * | 12/2009 | Kaplan | 701/423 |
| 8,010,284 | B2 * | 8/2011 | Kaplan | 701/414 |
| 8,285,310 | B1 * | 10/2012 | Shrum et al. | 455/457 |
| 8,352,175 | B2 * | 1/2013 | Bauchot et al. | 701/408 |
| 2009/0023456 | A1 * | 1/2009 | Seacat et al. | 455/456.1 |
| 2010/0036604 | A1 * | 2/2010 | O'Connell et al. | 701/202 |
| 2010/0088025 | A1 * | 4/2010 | Garg et al. | 701/209 |
| 2012/0143499 | A1 * | 6/2012 | Petersen | 701/450 |

* cited by examiner

*Primary Examiner* — Nicholas Kiswanto
(74) *Attorney, Agent, or Firm* — Merchant & Gould P.C.

(57) ABSTRACT

An alternative route solution includes consideration of network coverage provided by a navigation application. A device is knowledgeable of coverage areas of a carrier including problem zones. An alternate route to a desired destination is computed so that the alternative route is completely within the coverage areas of the carrier while avoiding the problem zones. The alternative route may be presented to the user on a display device, such as a smart phone, a GPS device, laptop, etc.

18 Claims, 8 Drawing Sheets

SYSTEM, METHOD AND DEVICE FOR PROVIDING NAVIGATION INFORMATION BASED ON COVERAGE AREA ASSESSMENT

CROSS-REFERENCE TO RELATED APPLICATIONS

This is a continuation-in-part application of U.S. application Ser. No. 13/340,299, filed Dec. 29, 2011, and titled "System, Method and Device for Providing Navigation Information Based on Coverage Area Assessment," the disclosure of which is expressly incorporated herein, in its entirety, by reference.

FIELD OF THE INVENTION

This disclosure relates in general to navigation applications for mobile devices and more particularly to providing navigation information based on coverage area assessment.

BACKGROUND

Consumers are using mobile devices more frequently for streaming media such as audio or video or fetching other useful data such as maps, etc. while in motion. One application that uses streaming data involves presenting maps for use in navigating to a desired destination. Mobile computing devices, for example smart phones, are being used more frequently to provide such navigation features. Navigation applications on mobile computing devices rely on the specific carriers' networks to obtain location information of the mobile device and guide the user to and from their destinations. Unfortunately, when a phones navigation application maps a route to an end destination, the carriers' network coverage is not considered.

One common limitation, though, when using mobile devices in this manner is that wireless "dead zones" (zones where there is not sufficient wireless signal strength or bandwidth) cause an interruption in streaming-type services. In addition, driving from areas with less network congestion (for example, the suburbs) to areas of greater network congestion (e.g. urban centers) may also cause an interruption in streaming content due to the over-congested networks. Other examples of reception limitations involve situations where interference with other cell sites occurs or where the radio signal is interrupted or attenuated by local topography. Since mobile devices rely on radio waves, and radio waves travel through the air and are easily attenuated, other factors may cause mobile devices to be unreliable at times. Areas that exhibit such limitations may commonly be referred to as problem zones that represent areas of unfavorable network conditions. If the mobile device travels through problem zones during the journey, the navigation application may cease to function. Further, the problem becomes more severe if the span of problem zones.

Accordingly, there is a need for a system for providing navigation information based on coverage area assessment.

SUMMARY OF THE INVENTION

To overcome the limitations described above, and to overcome other limitations that will become apparent upon reading and understanding the present specification, embodiments for providing navigation information based on coverage area assessment are disclosed.

The above described problems are solved by route navigation based on detection of problem zones. A mobile device or a navigation device is knowledgeable of the underlying carriers' coverage including problem zones. An alternate route to a desired destination is computed so that the alternative route is completely within the coverage areas of the carrier while avoiding the problem zones. The alternative route may be presented to the user on a display device, such as a smart phone, a GPS device, laptop, etc.

A method for providing navigation information based on coverage area assessment is disclosed. The method includes identifying parameters for a trip to a destination, determining route possibilities to travel to the identified destination, obtaining data regarding coverage areas of a carrier associated with the route possibilities, including identification of problem zones, comparing determined route possibilities to the coverage areas of the carrier associated with the route possibilities, including the identification of problem zones, determining a route within the coverage areas of the carrier to the identified destination while avoiding the problem zones and presenting the determined route for navigation to the destination.

In another embodiment, a system for providing navigation information based on coverage area assessment is disclosed. The system includes a network of a carrier comprising coverage areas and at least one problem zone, a database for storing data identifying the coverage areas of a carrier and the at least one problem zone and a navigation device, coupled to the database, for obtaining the data identifying the coverage areas of a carrier and the at least one problem zone, and for determining route possibilities using parameters defining a trip to a destination, wherein the navigation device compares the determined route possibilities to the identified coverage areas of the carrier to determine a route within the coverage areas of the carrier to the identified destination while avoiding the problem zones and presenting the determined route for navigation to the destination.

In another embodiment, a computer-readable storage medium including instructions, that when executed provides navigation information based on coverage area assessment is disclosed. The instructions include identifying parameters for a trip to a destination, determining route possibilities to travel to the identified destination, obtaining data regarding coverage areas of a carrier associated with the route possibilities, including identification of problem zones, comparing determined route possibilities to the coverage areas of the carrier associated with the route possibilities, including the identification of problem zones, determining a route within the coverage areas of the carrier to the identified destination while avoiding the problem zones and presenting the determined route for navigation to the destination.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to an alternative route solution that includes consideration of network coverage provided by a navigation application. A mobile device or a navigation device is knowledgeable of the underlying carriers' coverage including problem zones. An alternate route to a desired destination is computed so that the alternative route is completely within the coverage areas of the carrier while avoiding the problem zones. The alternative route may be presented to the user on a display device, such as a smart phone, a GPS device, laptop, etc.

Figure 1:
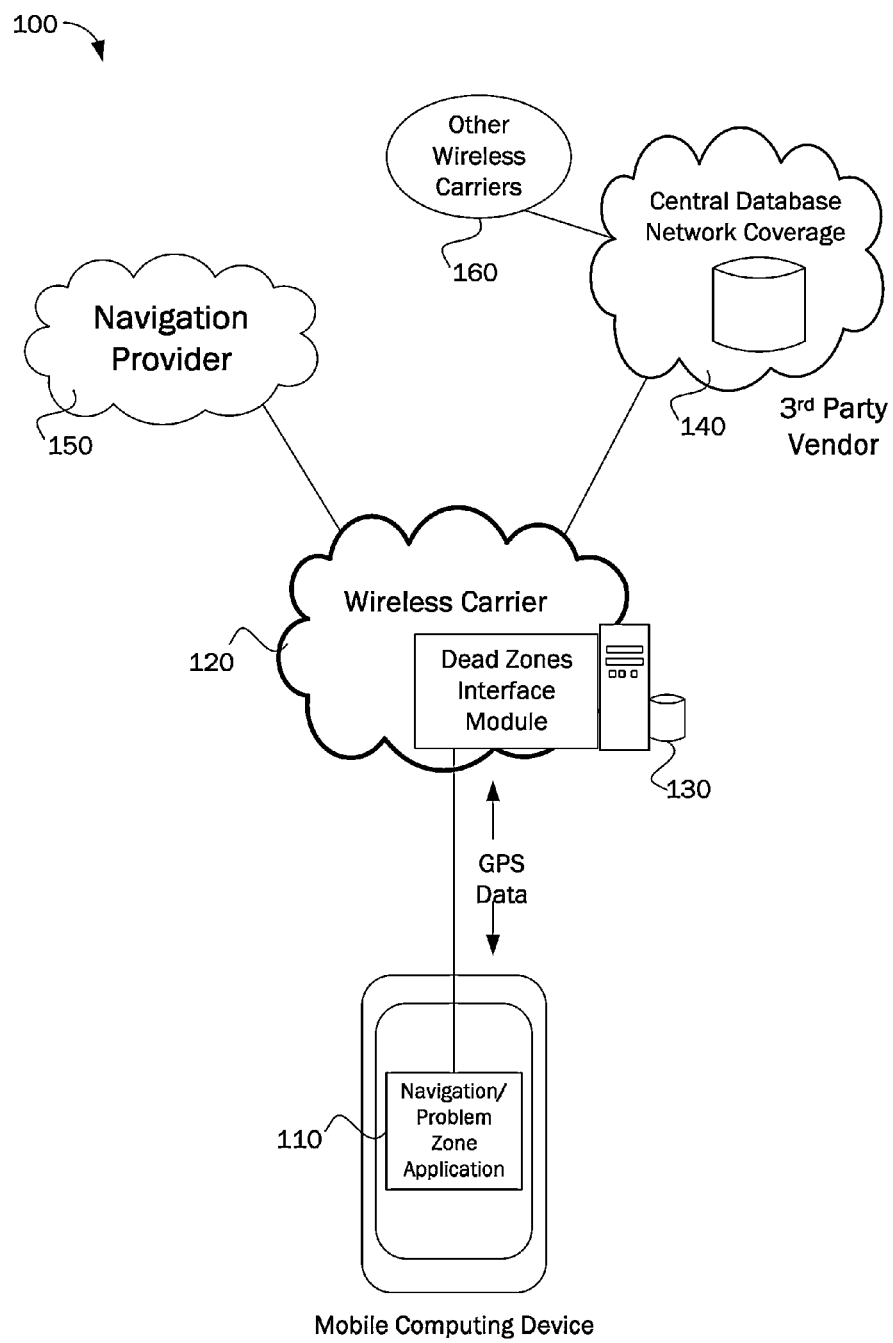
FIG. 1 illustrates several ways to implement a system that provides the navigation/problem zone application with network coverage information in order to present an optimal route according to one embodiment.

FIG. 1 illustrates several ways to implement a system 100 that provides the navigation/problem zone application with network coverage information in order to present an optimal route according to one embodiment. One scenario is the navigation/problem zone application 110 may be configured with the information on the carrier zones to provide the map. The navigation/problem zone application 110 maintains the information about all the carriers' coverage areas. Carriers may include various types of wireless carriers or other RF radio systems. Herein, wireless carrier will be used as an example most often, but those skilled in the art will recognize that embodiments are not meant to be limited to wireless carriers.

Wireless carrier 120 provides the coverage information to the navigation/problem zone application 110 or updates the coverage information in real-time or periodically. In the first scenario, the navigation application is fully network aware and may not need to interface with anyone since it is housed within its domain.

A second scenario for implementing the system is the navigation application 110 may communicate with a carrier 120. Thus, the wireless carrier 120 and the navigation provider 150 may partner with one another to provide the coverage data. When a user wants a particular route mapped, the navigation application 110 prompts a database 130 hosted within the carrier 120 for the coverage area within that particular route and then provides turn by turn direction for that user. If the navigation application 110 and the carrier 120 communicate with one another, a third party 140 is not needed. The navigation provider 150 can communicate directly with the carrier 120 so that the navigation application 110 may obtain coverage information through a direct relationship with the carrier 120.

Alternatively, in a third scenario, the wireless carrier 120 may partner with a third party navigation vendor 140 and the navigation application 110 obtains the coverage data from the third party 140. The third party may house coverage information for all carriers 160, thus it maintains and updates carrier network information. The navigation application 110 accesses the information at the third party 140 through an interface to obtain network coverage. Thus, the navigation application 110 may work directly with the third party 140 to obtain information for a particular carrier.

Figure 2:
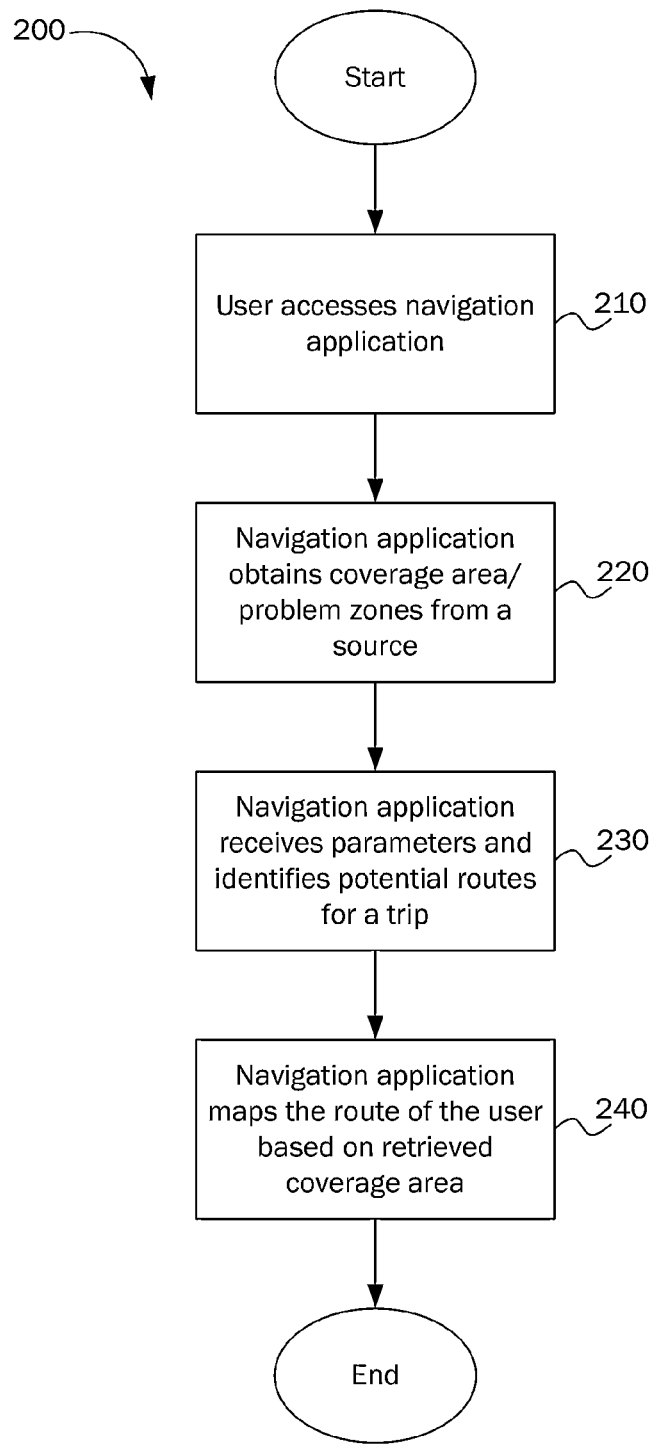
FIG. 2 is a flow chart of a process for providing navigation information based on a coverage area assessment according to one embodiment.

FIG. 2 is a block diagram 200 of a process for providing navigation information based on a coverage assessment according to one embodiment. A user accesses a navigation application 110 on the mobile computing device (210) that is made network aware since the navigation application obtains the coverage area map (identifying problem zones or zones of unfavorable network conditions) (220). The navigation application 110 on the mobile device may be made carrier network aware by: a) user input, or b) the navigation application implementing calls to a central database 140 that houses details about all wireless phone numbers and the associated carriers. After carrier specific information is obtained, the navigation/problem zone application 110 will need to interface with the system to retrieve network coverage details of the carrier 120. The navigation application may fetch information from a system which may reside within its domain or may be provided by a third party.

The navigation application 110 receives parameters for a trip such as starting point and ending point, and then identifies potential routes for the trip (230). The navigation application then maps the route of the user based on the retrieved coverage area (240). Thus, the user is provided with an optimal route having coverage from the carrier 120 at all times during the trip based on the comparison of the identified potential routes and the obtained carrier coverage map.

Figure 3:
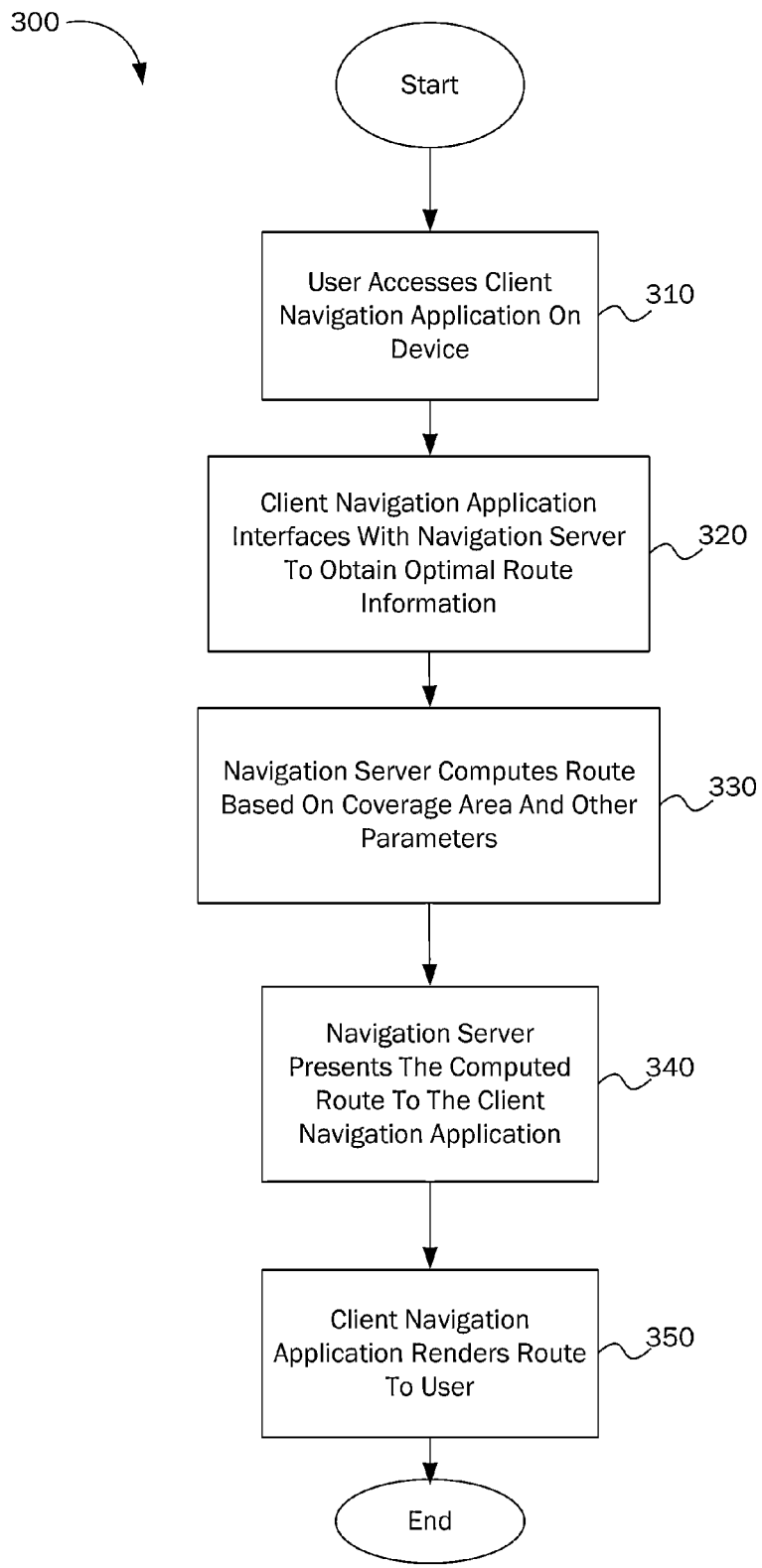
FIG. 3 illustrates a flow chart of a client/server process for providing navigation information based on a coverage assessment wherein a light client navigation application interfaces with a navigation server according to one embodiment.

FIG. 3 illustrates a flow chart 300 of a client/server process for providing navigation information based on a coverage assessment wherein a light client navigation application interfaces with a navigation server 150 according to one embodiment. In FIG. 3, the client/server system is provided by the same source, e.g., the wireless carrier. FIG. 3 illustrates that a user accesses a client navigation application 110 on a mobile computing device (310). The client navigation application interfaces with a navigation server 150 to obtain route information (320). The navigation server computes a route based on coverage area and other parameters (330). The navigation server 150 presents the route to the client navigation application 110 (340). The client navigation application renders the route to the user (350). The parameters may be optimization parameters and the computed route may be optimized based on the obtained route information and parameters, e.g., computed route avoids problem zones.

Figure 4:
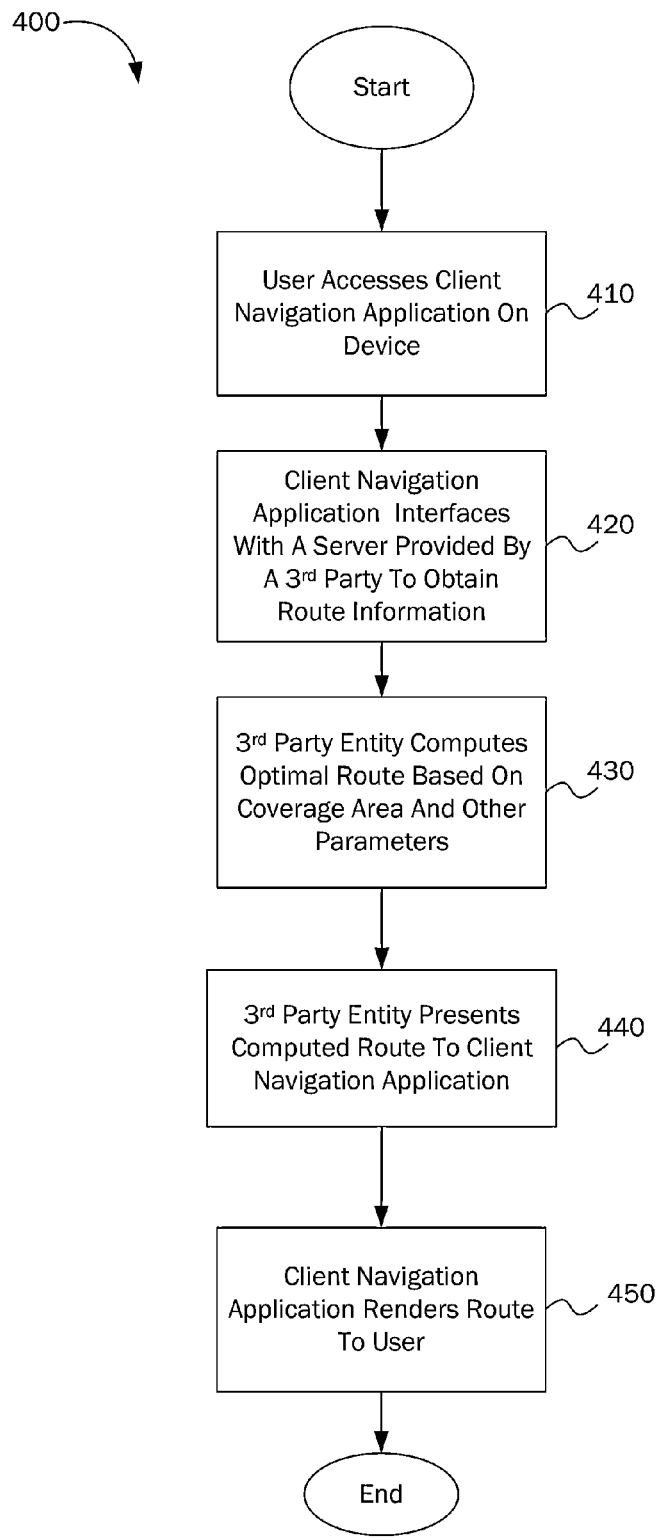
FIG. 4 illustrates a flow chart of a client/server process for providing navigation information based on a coverage assessment wherein a light, client navigation application interfaces with a third party entity according to an embodiment.

FIG. 4 illustrates a flow chart 400 of a client/server process for providing navigation information based on a coverage assessment wherein a light, client navigation application 110 interfaces with a third party entity 140 according to an embodiment. In FIG. 4, the client and server systems are is provided by different sources, e.g., the wireless carrier and a third party navigation provider. FIG. 4 illustrates that a user accesses a client navigation application 110 on device (410).

A client navigation application interfaces with a server provided by a third party to obtain optimal route information (420). The third party entity 140 has details/information about wireless carrier coverage areas. This information may be updated by wireless carriers 120,160 on a regular basis. The third party entity computes a route based on coverage area and other parameters (430). The third party entity then presents the computed route to the client navigation application (440). The client navigation application renders the route to the user (450). Again, the parameters may be optimization parameters and the computed route may be optimized based on the obtained route information and parameters (e.g., computed route avoids problem zones).

Figure 5:
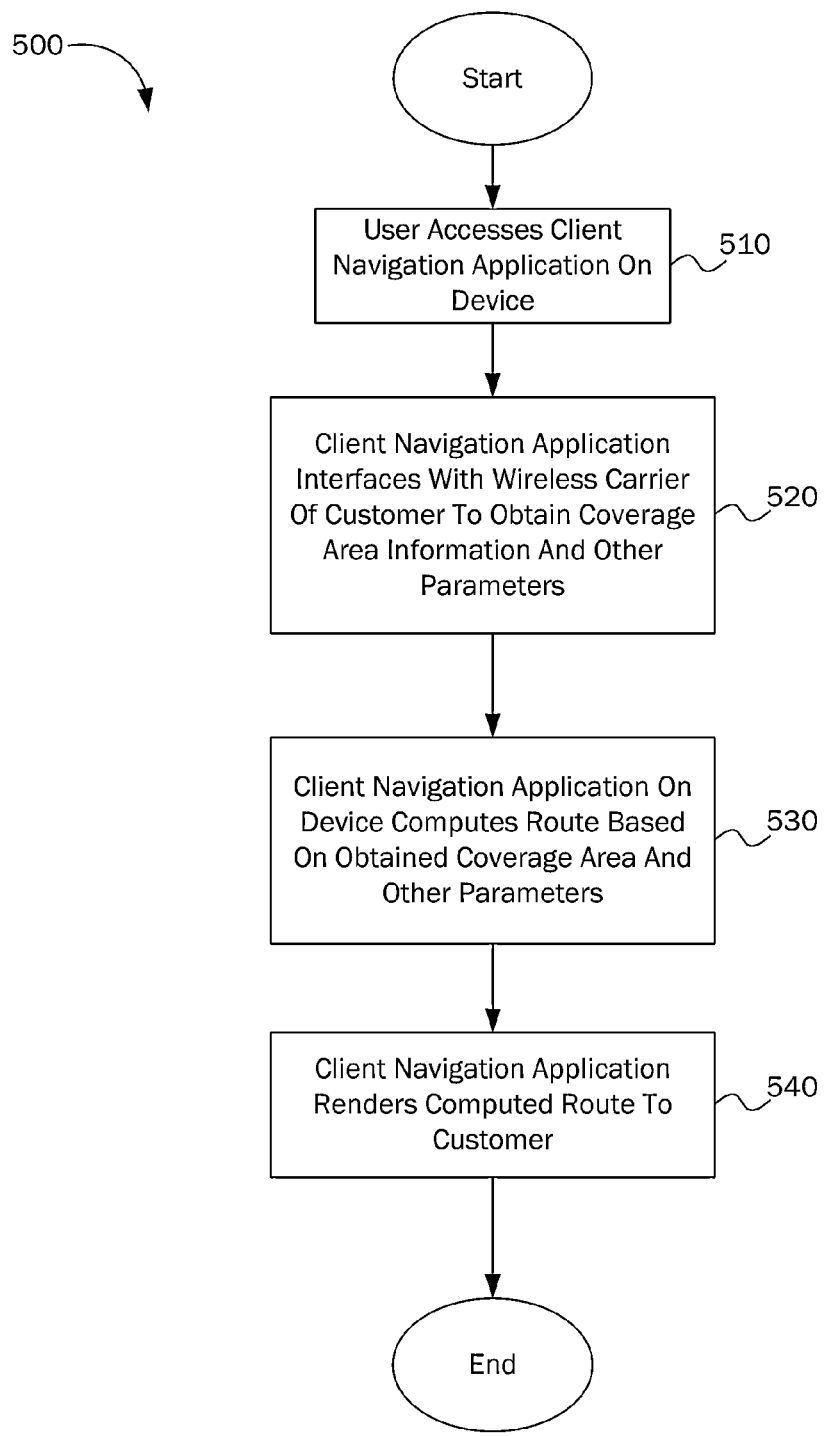
FIG. 5 illustrates a flow chart of a client/server process for providing navigation information based on a coverage assessment wherein a light, client navigation application resides on a client device for using a network, and interfaces with the wireless carrier for coverage area information and other parameters to render optimal route information according to an embodiment.

FIG. 5 illustrates a flow chart 500 of a client/server process for providing navigation information based on a coverage assessment wherein a light, client navigation application 110 resides on a client device for using a network, e.g., a carrier network, and interfaces with the wireless carrier 120 for coverage area information and other parameters to render optimal route information according to an embodiment. FIG. 5 illustrates that a user accesses a client navigation application on device (510). The client navigation application interfaces with wireless carrier of the customer to obtain coverage area information and other parameters (520). The other parameters may include optimization parameters such as highways information, traffic lights, construction, etc., and may be provided by the carrier. The carrier may provide the other parameters/information by housing the information within its domain or obtaining it from a third party entity. The client navigation application computes a route based on the obtained coverage area and other parameters (530). The computed route may be optimized based on the obtained route information and parameters, e.g., computed route avoids problem zones. The client navigation application then renders the computed map on the device to the customer (540).

Figure 6:
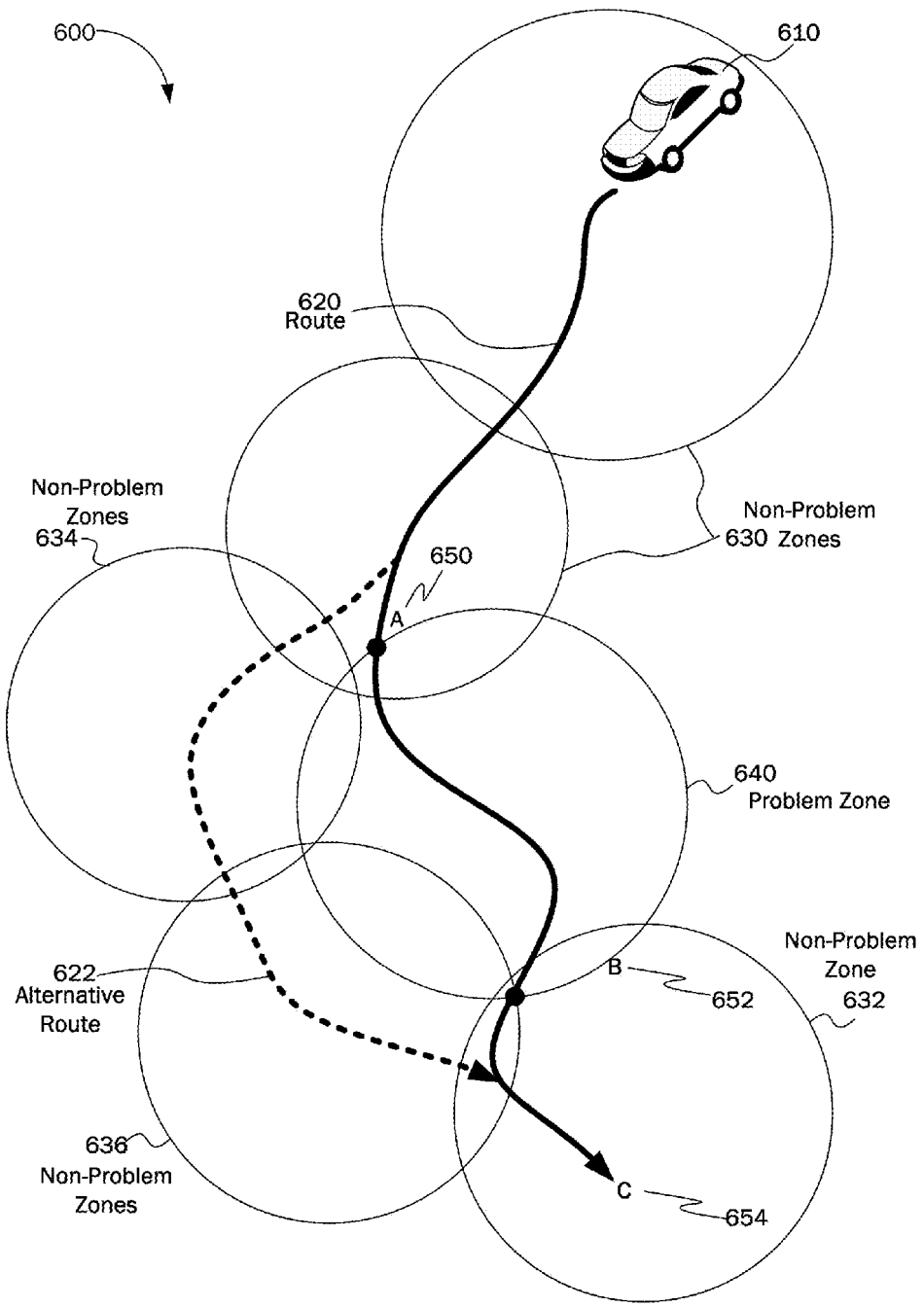
FIG. 6 illustrates a method for providing navigation information based on coverage area assessment according to an embodiment.

FIG. 6 illustrates a method 600 for providing navigation information based on coverage area assessment according to an embodiment. In FIG. 6, a user of a mobile device (not shown) is in an automobile 610 that is traveling along a pre-planned route 620. The route is covered by a mobile communications system that is represented by cells 630, 632 and 640. Cells 630, 632 represent cells that are not problem zones, i.e., areas of favorable network conditions. In cells 630 and 632, streaming data can be assumed to be received by the user in automobile 610 without significant interruption or interference. As mentioned above, a common buffering methodology may be used to compensate for minor problems in data reception.

However, cell 640 is a known problem zone. Thus, the user in automobile 610 will experience a substantial disruption in service while in problem zone cell 640 from point A 650 to point B 652 along route 620. As such, the common buffering methodology used to compensate for minor problems in data reception, cannot provide continuous delivery of data and therefore a significant portion of any streamed data will be lost. Those skilled in the art will recognize that data reception is only one parameter for which the embodiments described herein may compensate. For example, as described above, problem zone 640 may only represent a roaming area serviced by another carrier.

Therefore, a navigation device used by the driver of automobile 610 compares route possibilities to the coverage areas of the carrier, including the identification of problem zones. The possible route possibilities reveal the possibility of using cells 634 and 636 to reach destination C 654. Thus, the navigation device determines an alternative route 622 within the coverage areas of the carrier to the identified destination C 654 while avoiding the problem zones. The alternative route 622 veers from the original route 620 to use cells 634 and 636 to reach destination C 654 while avoiding problem zone 640. The alternate route 622 to destination C 654 that is completely within the coverage areas of the carrier while avoiding the problem zones may be presented to the user in automobile 610 on a display device, such as a smart phone, a GPS device, laptop, etc.

Figure 7:
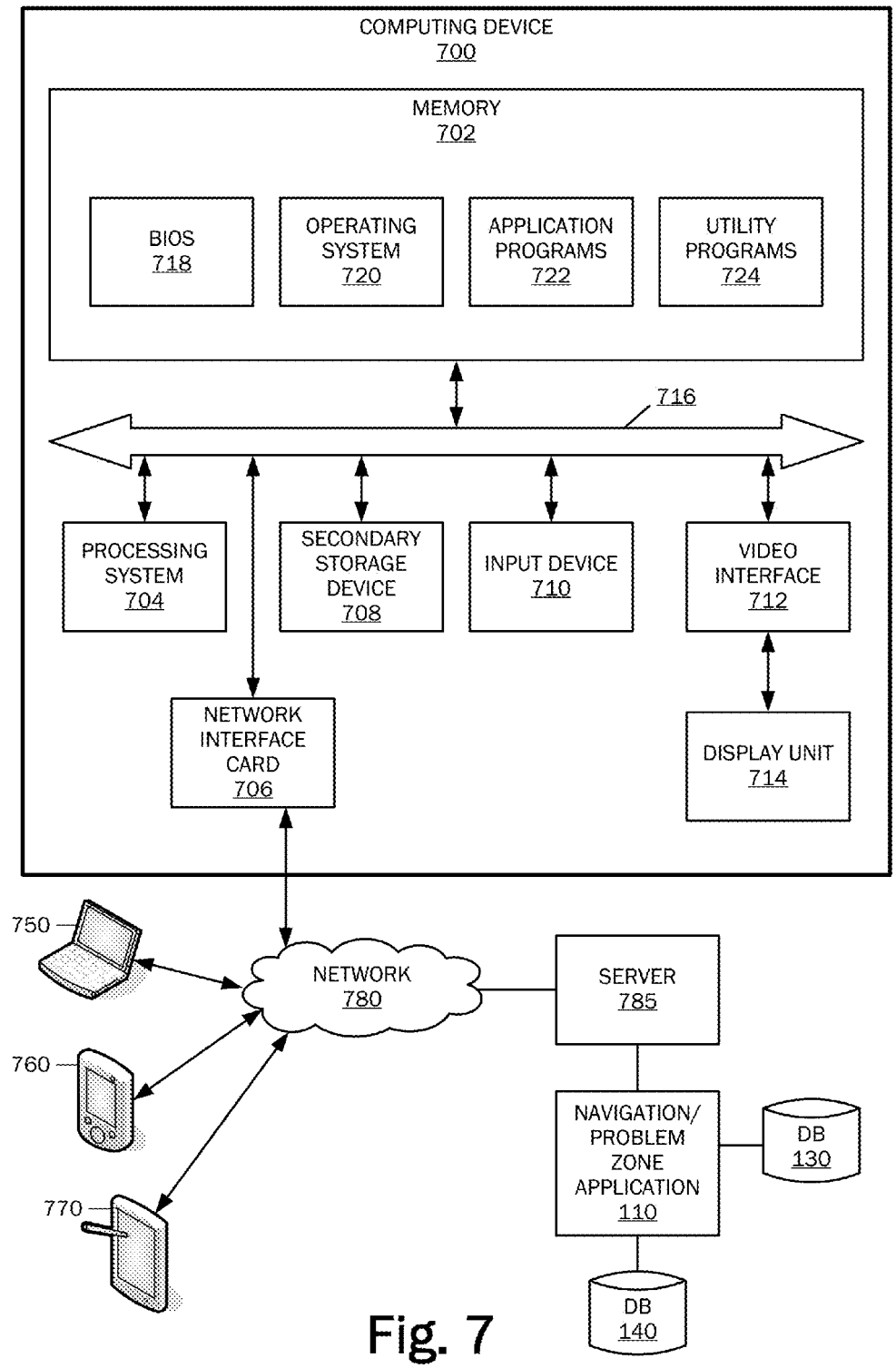
FIG. 7 is a block diagram illustrating example physical components of a computing device and a system architecture for providing route navigation based on coverage area assessment.

FIG. 7 illustrates an example computing device 700 with which embodiments of the present invention may be implemented. In some embodiments, the dead zones interface module database 130 and central database network coverage 140 may be implemented using one or more computing devices like the computing device 700. It should be appreciated that in other embodiments, the dead zones interface module database 130 and central database network coverage 140 may be implemented using computing devices having hardware components other than those illustrated in the example of FIG. 7.

Computing devices may be implemented in different ways in different embodiments. For instance, in the example of FIG. 7, the computing device includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules.

The memory 702 includes one or more computer-readable storage media capable of storing data and/or computer-executable instructions. Memory 702 thus may store the computer-executable instructions that, when executed by processor 704, provide navigation information based on coverage area assessment as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and nonremovable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users. According to an embodiment, memory may store the navigation/problem zone application 110. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 7 may be integrated onto a single integrated circuit. When operating via such a single integrated circuit, the functionality, described herein, with respect to the navigation/problem zones application 110 may be operated via application-specific logic integrated with other components of the computing device/system 700 on the single integrated circuit.

FIG. 7 also illustrates a system architecture for providing navigation information based on coverage area assessment according to an embodiment. Problem zones, including dead zone, congestion, roaming, or other network status information developed, interacted with or edited in association with a navigation/problem zones application 110 may be stored in different communication channels or other storage types and accessed by application 110. The navigation/problem zone application 110 may use any of these types of systems or the like for enabling data utilization, as described herein. The server 785 may provide coverage area assessment and navigation information to client devices. As one example, server 785 may be a web server providing coverage area assessment and navigation information over the web. Server 785 may provide coverage area assessment and navigation information over the web to clients through a network 780. Examples of clients that may obtain the completion service information include computing device 750, which may include any general purpose personal computer (such as computing device 700), a tablet computing device 770 and/or mobile computing device 760, such as smart phones.

FIG. 8 is a block diagram of a mobile computing device with which embodiments of the present invention may be practiced. The mobile computing device 760 is illustrative of any suitable device, such as a mobile telephone, personal digital assistant (PDA), or handheld computer, operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 760 may be performed via a variety of suitable means, such as, touch screen input via the display screen 805, keyboard or keypad input via a data entry area 810, key input via one or more selectable buttons or controls 815, voice input via a microphone 820 disposed on the device 760, photographic input via a camera 825 functionality associated with the mobile computing device, or any other suitable input means. Data may be output via the device 760 via any suitable output means, including but not limited to, display on the display screen 805, audible output via an associated speaker 830 or connected earphone system, vibration module for providing tactile output, and the like.

Figures 8A, 8B:
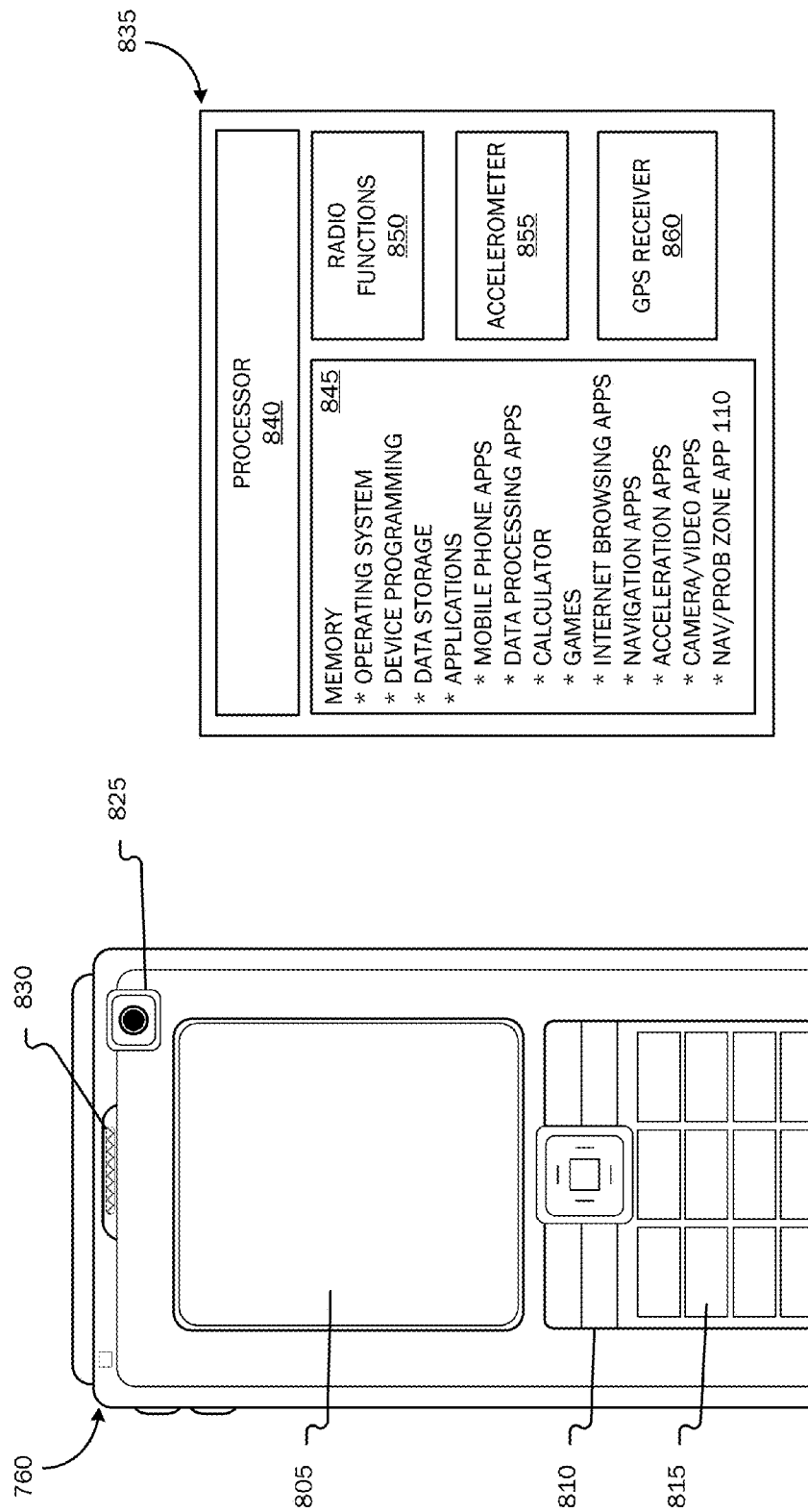
FIGS. 8a-b illustrate a suitable mobile computing environment, for example, a mobile computing device, a smart phone, a tablet personal computer, a laptop computer, and the like, with which embodiments may be practiced.

Referring now to FIG. 8B, operational unit 835 is illustrative of internal operating functionality of the mobile computing device 760. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to embodiment, mobile computing device 760 may include a navigation/problem zones application 110 operable to provide navigation information based on coverage area assessment as described here. Mobile computing device 760 may contain an accelerometer 855 for detecting acceleration, and can be used to sense orientation, vibration, and/or shock. Mobile computing device 760 may contain a global positioning system (GPS) system (e.g., GPS send/receive functionality) 860, which when coupled with a navigation application, can pinpoint the device's 760 location, give directions to a provided destination, and may provide information about nearby businesses. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 760 to communicate with other communication devices and systems via a wireless network. Radio functions 850 may be utilized to communicate with a wireless or WIFI-based positioning system to determine a device's 760 location.

Although described herein in combination with mobile computing device 760, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing navigation information based on coverage area assessment, comprising:
    identifying parameters for a trip to a destination;
    determining route possibilities to travel to the destination;
    obtaining data, via a navigation device coupled to a database, regarding coverage areas of more than one carrier associated with the route possibilities, including identification of problem zones in each carriers' coverage areas;
    assessing the coverage areas of one carrier along a route to the destination and assessing the coverage areas of another carrier along another route, that corresponds partially with the route of the one carrier, to the destination;
    determining an optimal route within the coverage areas of the one carrier to the destination while avoiding the problem zones in each carriers' coverage areas; and
    presenting the determined optimal route for navigation to the destination through the coverage areas of the one carrier and presenting at least one problem zone of the other carrier to avoid while navigating to the destination.

2. The method of claim 1, wherein the determining an optimal route comprises maintaining the route within the coverage areas of the one carrier, minimizing a distance traversed to the destination; minimizing traffic light encounters, maximizing use of controlled-access highways and avoiding construction.

3. The method of claim 1, wherein the determining the route further comprises determining the route based on a carrier coverage map, a calculated shortest distance for the trip, avoidance of traffic lights, and avoiding construction and staying on highways.

4. The method of claim 1, wherein the identifying parameters for a trip to a destination comprises receiving a starting point and an ending point.

5. The method of claim 1, wherein the presenting the determined route comprises presenting the determined route on a display showing a map of the determined route.

6. A system for providing navigation information based on coverage area assessments, comprising:
   multiple carriers comprising coverage areas;
   a database for storing data identifying the coverage areas of multiple carriers and problem zones associated with one or more of the carriers; and
   a navigation device, coupled to the database, for obtaining the data identifying the coverage areas of the multiple carriers and for identifying the problem zones associated with one or more of the carriers, and for determining route possibilities using parameters defining a trip to a destination, wherein the navigation device assesses the coverage areas of one carrier along a route to the destination and assesses the coverage areas of another carrier along another route, that corresponds partially with the route of the one carrier, to the destination to determine an optimal route within the coverage areas of the one carrier to the destination while avoiding the problem zones and presenting the determined optimal route through the coverage areas of the one carrier and presenting at least one problem zone associated with the other carrier for navigation to the destination.

7. The system of claim 6, wherein the navigation device determines the optimal route by maintaining the route within the coverage of the one carrier, minimizing a distance traversed to the destination; minimizing traffic light encounters, maximizing use of controlled-access highways and avoiding construction.

8. The system of claim 6, wherein the navigation device determines the route by determining the route based on a carrier coverage map, a calculated shortest distance for the trip, avoidance of traffic lights, and avoiding construction and staying on highways.

9. The system of claim 6, wherein the parameters for a trip to the destination comprises a starting point and an ending point.

10. The system of claim 6, wherein the navigation device presents the determined route on a display showing a map of the determined route.

11. The system of claim 6, wherein the navigation device maintains information about all the coverage areas of carriers.

12. The system of claim 6, wherein the navigation device is network aware.

13. The system of claim 6, wherein the database is hosted within the carrier, the navigation device accesses the database for the coverage area within the determined optimal route.

14. The system of claim 6, wherein the navigation device obtains the data from a third party.

15. The system of claim 6, wherein a navigation application is provided on a mobile device.

16. The system of claim 6, wherein the navigation application is provided by a distinct navigation provider.

17. The system of claim 6, wherein the navigation device implements a call to a central database that houses details about all wireless phone numbers and the carriers, the central database identifies the navigation device and provides coverage areas associated with the navigation device.

18. A computer-readable storage device including instructions, that when executed provides navigation information based on coverage area assessment, the instructions comprising:
   identifying parameters for a trip to a destination;
   determining route possibilities to travel to the destination;
   obtaining data regarding coverage areas of multiple carriers associated with the route possibilities, including identification of problem zones;
   assessing the coverage areas of one carrier along a route to the destination and assessing the coverage areas of another carrier along another route, that corresponds partially with the route of the one carrier, to the destination;
   determining an optimal route within the coverage areas of the carrier to the identified destination while avoiding the problem zones; and
   presenting the determined optimal route for navigation to the destination through the coverage areas of the one carrier and presenting at least one problem zone of the other carrier to avoid while navigating to the destination.

* * * * *